(12) United States Patent
Genilier et al.

(10) Patent No.: US 11,542,833 B2
(45) Date of Patent: Jan. 3, 2023

(54) DEVICE FOR COOLING AN ANNULAR OUTER TURBINE CASING

(71) Applicant: SAFRAN AIRCRAFT ENGINES, Paris (FR)

(72) Inventors: Arnaud Lasantha Genilier, Moissy-Cramayel (FR); François Pierre Michel Comte, Moissy-Cramayel (FR); Fabien Stéphane Garnier, Moissy-Cramayel (FR); Vincent François Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 38 days.

(21) Appl. No.: 16/623,086

(22) PCT Filed: Jun. 4, 2018

(86) PCT No.: PCT/FR2018/051284
§ 371 (c)(1),
(2) Date: Dec. 16, 2019

(87) PCT Pub. No.: WO2018/229385
PCT Pub. Date: Dec. 20, 2018

(65) Prior Publication Data
US 2020/0182089 A1 Jun. 11, 2020

(30) Foreign Application Priority Data
Jun. 15, 2017 (FR) ........................ 1755411

(51) Int. Cl.
*F01D 25/14* (2006.01)
*F01D 25/12* (2006.01)

(52) U.S. Cl.
CPC ............. *F01D 25/14* (2013.01); *F01D 25/12* (2013.01); *F05D 2220/323* (2013.01); *F05D 2260/231* (2013.01)

(58) Field of Classification Search
CPC ................................. F01D 25/14; F01D 25/12
See application file for complete search history.

(56) References Cited

U.S. PATENT DOCUMENTS 4,841,726 A * 6/1989 Burkhardt ............... F01D 11/24
415/116
5,205,115 A * 4/1993 Plemmons .............. F01D 11/24
60/806

(Continued)

FOREIGN PATENT DOCUMENTS

EP 1 505 261 A1 2/2005
EP 2 236 772 A2 10/2010

(Continued)

OTHER PUBLICATIONS

International Patent Application No. PCT/FR2018/051284, International Search Report and Written Opinion dated Nov. 14, 2018, 11 pgs. [relevance found in citations and English translation of International Search Report].

*Primary Examiner* — Igor Kershteyn
*Assistant Examiner* — John S Hunter, Jr.
(74) *Attorney, Agent, or Firm* — Lathrop GPM LLP (57) ABSTRACT

A device (26) for cooling an annular outer turbine casing (17) includes at least one circumferentially extending tube (27) having an air inlet intended for conveying cooling air, the tube having a radially inner wall provided with cooling air discharge openings and a radially outer wall arranged radially opposite each other, an air inlet manifold (28), the inlet of the tube opening into the manifold, the tube (27) including at least one intermediate wall extending over a circumferential portion of the tube from the air inlet, the (Continued)

intermediate wall being located radially between the radially inner wall and the radially outer wall, the radially inner wall and the intermediate wall forming a first air conveying duct, the radially outer wall and the intermediate wall forming a second air conveying duct extending circumferentially beyond the first air conveying duct, relative to the air inlet.

14 Claims, 5 Drawing Sheets

(56) References Cited

U.S. PATENT DOCUMENTS

| | | | | |
|---|---|---|---|---|
| 7,114,914 | B2* | 10/2006 | Gendraud | F01D 11/24 |
| | | | | 415/108 |
| 8,708,638 | B2* | 4/2014 | Morgenstern | F01D 11/24 |
| | | | | 415/1 |
| 2008/0166221 | A1 | 7/2008 | Morgenstern et al. | |

FOREIGN PATENT DOCUMENTS

| | | |
|---|---|---|
| FR | 2 766 232 A1 | 1/1999 |
| GB | 2 217 788 A | 11/1989 |

* cited by examiner

DEVICE FOR COOLING AN ANNULAR OUTER TURBINE CASING

CROSS-REFERENCE TO RELATED APPLICATIONS

This application is a 35 U.S.C. § 371 filing of International Application No. PCT/FR2018/051284 filed Jun. 4, 2018, which claims the benefit of priority to French Patent Application No. 1755411 filed Jun. 15, 2017, each of which is incorporated herein by reference in its entirety.

FIELD OF THE INVENTION

This invention relates to a device for cooling the annular outer turbine casing.

TECHNICAL BACKGROUND

The field of application is in particular that of aeronautical engines, such as aircraft turbojet engines or turboprop engines. However, the invention is applicable to other turbomachines, such as industrial turbines.

Figure 1:
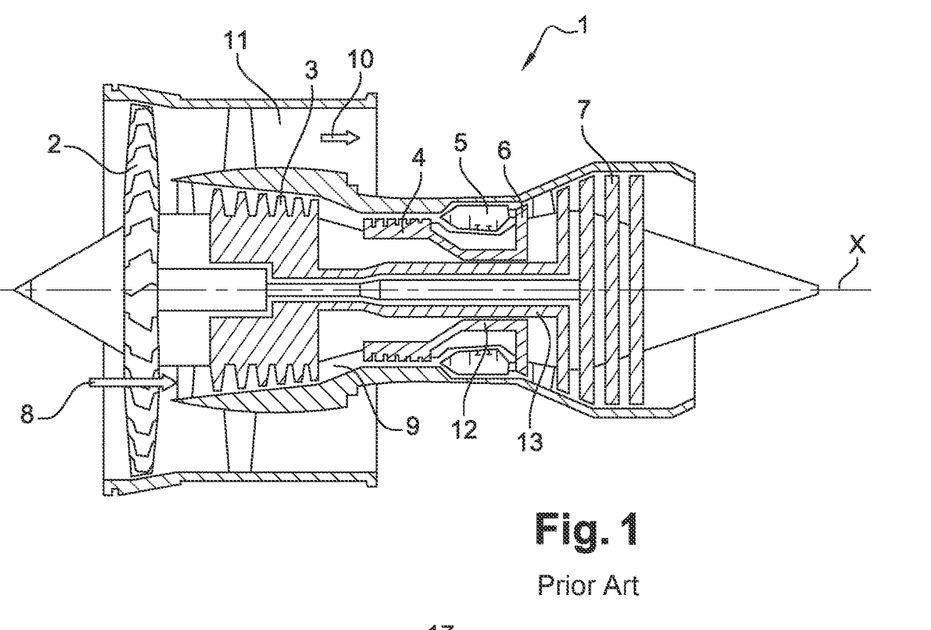
FIG. 1 is a cross-sectional schematic view of a turbomachine.

FIG. 1 shows a turbomachine 1 with double flow and double spool. The longitudinal axis of the turbomachine is referenced X and corresponds to the axis of rotation of the rotating parts. In the following, the terms axial and radial are defined in relation to the X axis.

Turbomachine 1 has, from upstream to downstream in the direction of gas flow, a blower 2, a low-pressure compressor 3, a high-pressure compressor 4, a combustion chamber 5, a high-pressure turbine 6 and a low-pressure turbine 7.

The air from fan 2 is divided into a primary flow 8 flowing into a primary annular vein 9, and a secondary flow 10 flowing into a secondary annular vein 11 surrounding the primary annular vein 10.

The low-pressure compressor 3, the high-pressure compressor 4, the combustion chamber 5, the high-pressure turbine 6 and the low-pressure turbine 7 are located in the primary section 9.

The rotor of the high pressure turbine 6 and the rotor of the high pressure compressor 4 are coupled in rotation via a first shaft 12 in order to form a high pressure body.

The rotor of the low-pressure turbine 7 and the rotor of the low-pressure compressor 3 are coupled in rotation via a second shaft 13 in order to form a low-pressure body, the blower 2 being able to be connected directly to the rotor of the low-pressure compressor 3 or via an epicyclic gear train for example.

Figure 2:
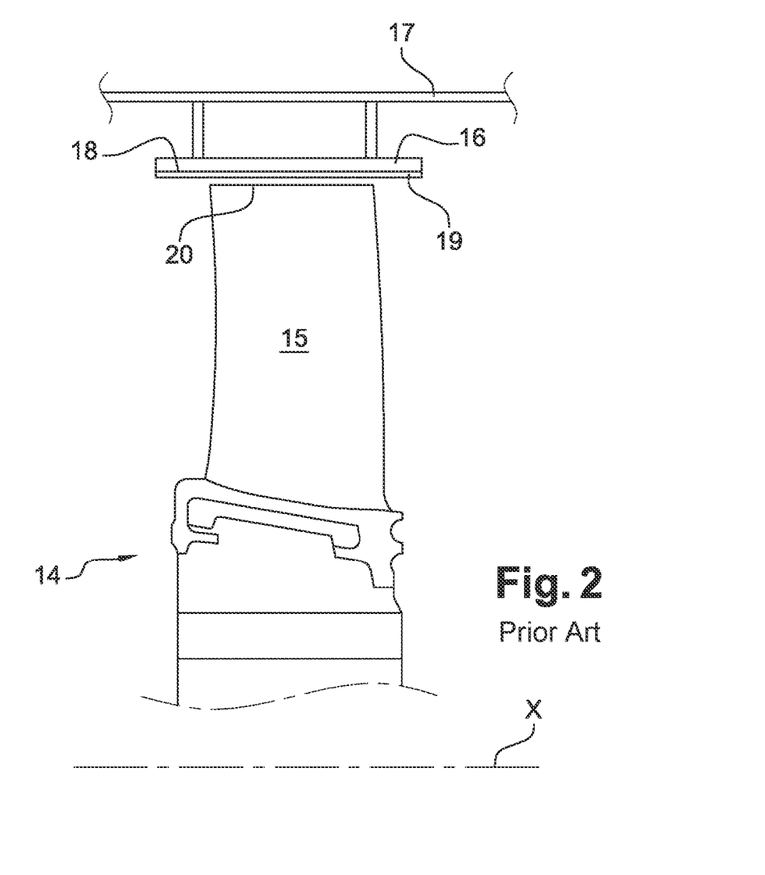
FIG. 2 is a detailed cross-sectional schematic view of a portion of a low or high pressure turbine.

Typically, as shown in FIG. 2, the rotor of the (low pressure or high pressure) turbine 6, 7 comprises a plurality of 14 impellers with blades 15 surrounded by a turbine ring 16 externally delimiting the gas flow section. Each ring 16 is generally made of a metal alloy, for example a nickel-based alloy, and is attached to an annular outer turbine casing 17 that extends along the longitudinal axis X, directly or through a spacer for example.

The radially inner surface 18 of the ring 16 may have an abradable coating 19 to limit the flow of stray air between the radially outer end 20 of the blades 15 and the ring 16. The ring 16 also has a function of reconstituting the upper jet and thus prevents any reintroduction of hot air into the casing 17.

In operation, the heat of the gases circulating in the turbine causes the turbine elements, particularly the annular outer casing, to expand 17. The ring 16, which is fixed to the annular outer casing 17, is then also expanded, resulting in the abradable coating 19 being radially spaced from the radially outer end of the blades, which affects the performance of the turbomachine 1.

It is then necessary to control the expansion of the annular outer casing 17 to limit the flow of stray air between the radially outer end 20 of the blades 15 and the ring 16.

Document FR 2 766 232 describes a device for cooling an annular turbine casing.

US 2008/0166221 also describes a device 21 for cooling an annular outer casing 22 of a turbine. This device 21, shown in FIGS. 3 and 4 to 6, includes tubes 23 extending circumferentially around the outer casing 22. The tube 23 has a cross-section tapering from a first fresh air supply end 24 of tube 23 to a circumferentially opposite second end 25.

Figure 3:
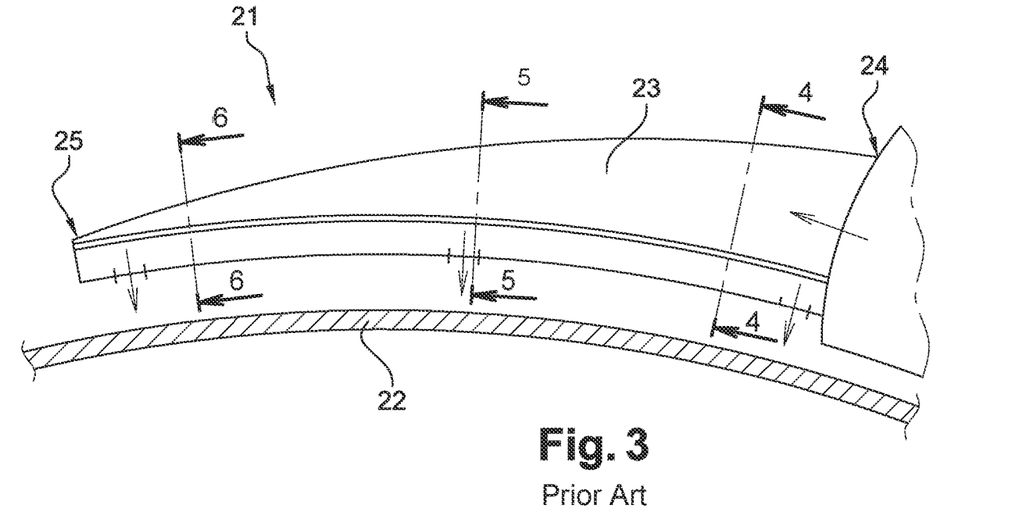
FIG. 3 is a schematic view, of an annular outer turbine casing of the prior art.
Figure 4:
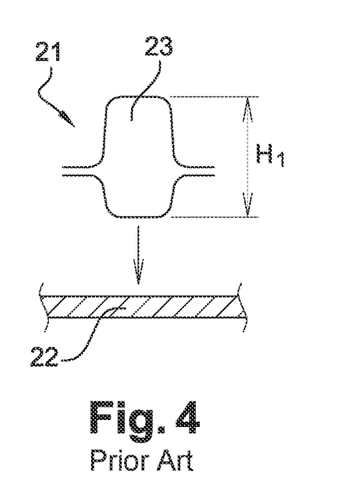
FIGS. 4-6 are cross-sectional views of a tube of the device, according to planes 4-4, 5-5, 6-6 of FIG. 3.
Figure 5:
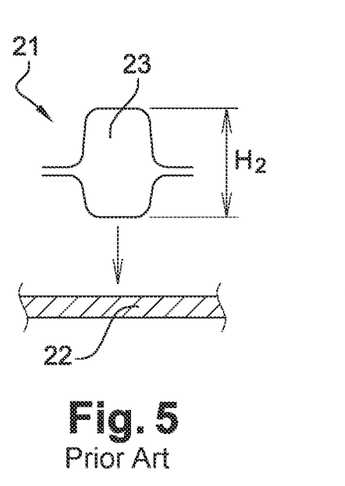
Figure 6:
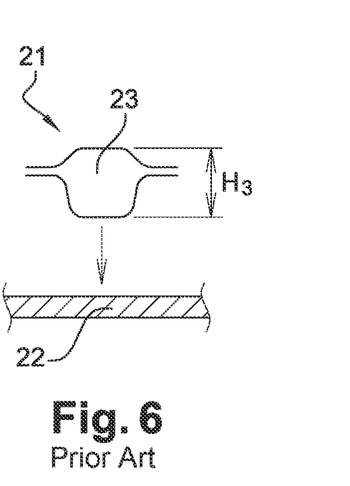

FIGS. 4 to 6 represent various sections of the tube 23 of the device of the prior art according to section planes 4-4, 5-5 and 6-6 of FIG. 3, respectively. It can be seen in these figures that the radial extension dimension H1 of the tube 23 in section 4-4, near the first fresh air supply end 24, is substantially equal to the radial extension dimension H2 in section 5-5 and greater than the radial extension dimension H3 of section 6-6, near the second end 25.

In operation, the air circulating in each tube 23 is gradually heated by the radiation of the casing 22 from the first fresh air supply end 24 of the tube 23 to the opposite end 25 of the tube 23 so that it is difficult to achieve uniform cooling over the entire circumference of the outer casing 22. Indeed, air is colder near the first fresh air supply end 24 of the tube 23 since the air in this zone comes directly from the air inlet, therefore, the cooling of the casing 22 is more efficient in this zone. Conversely, air is warmer in the circumferential zone away from the first fresh air supply end 24, the cooling of the casing 22 is less effective in this zone.

Other cooling devices are known from documents GB 2 217 788, EP 2 236 772 and EP 1 505 261.

The invention aims to remedy these various constraints in a simple, reliable and inexpensive way.

SUMMARY OF THE INVENTION

For this purpose, the invention proposes a device for cooling an annular outer turbine casing, the device comprising at least one tube extending circumferentially around the annular outer casing and having an air inlet, intended for conveying the cooling air, said tube having a radially inner wall provided with cooling air discharge openings and a radially outer wall arranged radially opposite each other, an air inlet manifold, the inlet of the tube opening into said manifold, characterized in that the tube comprises at least one intermediate wall extending over a circumferential portion of the tube from the air inlet, the intermediate wall being located radially between the radially inner wall and the radially outer wall, the radially inner wall and the intermediate wall forming a first air duct, the radially outer wall and the intermediate wall forming a second air duct extending circumferentially beyond the first air duct, relative to the air inlet.

Thus, in operation, cooling air, for example from a compressor of a turbomachine, is conveyed through both the first and second ducts before being discharged through the corresponding openings opposite the casing to be cooled. The cooling air flowing through each of the ducts is gradually heated as it passes through the corresponding duct. The cooling air in the second duct is protected from such heating by the presence of the first duct radially inside the second duct, i. e. radially between the second duct and the casing to be cooled.

In this way, in a first angular range, for example, between 0 and 45° from the air inlet, the cooling air comes from the first duct, and in a second angular range, for example, between 45 and 90°, the cooling air comes from the second duct. In the first angular range, the heating of the cooling air circulating in the second duct is prevented by the presence of the first duct which forms an insulating volume.

The intermediate wall can extend circumferentially at an angle between 0 and 45° from the air inlet, while the radially inner and outer walls can each extend at an angle between 0 and 90° from the air inlet.

The air inlet can be formed by one end of the tube. The air inlet can lead to a manifold, for example.

The cross-section of the tube can decrease with the circumferential position relative to the air inlet.

This limits the radial dimension of the cooling system according to its circumference. It should be noted that the first duct is only present on a portion of the tube located on the air inlet side. It is therefore easy to reduce the cross-section of the tube opposite the air inlet.

The cross-section of the tube and ducts can be square or rectangular.

The ducts can be formed with the tube by additive manufacturing to facilitate their construction.

The device may include an air inlet manifold, with the inlet of the tube leading into the manifold.

The manifold may have an air supply port, with air flowing into said manifold through said air supply port. Said air supply port can be oriented radially or circumferentially.

In this way, the air can flow radially into the manifold. Alternatively, the air can be discharged circumferentially or tangentially into the manifold.

The device may include at least two tubes axially offset from each other, with the air inlet of each tube opening into said manifold. Each air inlet can be designed so that the air from the manifold enters the corresponding tube circumferentially or tangentially.

The device may include at least two tubes extending circumferentially opposite each other, with the air inlet of each tube opening into said manifold.

The invention also relates to a turbine assembly, comprising an annular casing and a cooling device of the aforementioned type, located radially outside the casing, the air discharge openings facing the casing.

The invention also relates to a turbine for a turbomachine, comprising an assembly of the aforementioned type.

The turbine is for example a low pressure turbine.

The tubes may have identical structures and dimensions.

The device may include fixing means to fix the tubes to the casing.

BRIEF DESCRIPTION OF THE FIGURES

The invention will be better understood and other details, characteristics and advantages of the invention will appear when reading the following description, which is given as a non-limiting example, with reference to the appended drawings.

DETAILED DESCRIPTION

In the detailed description, the elements of the turbomachine 1 cited in reference to FIGS. 1 and 2 keep the same numerical references.

FIGS. 7 to 12 show a cooling device 26 for an outer casing 17 according to one embodiment of the invention.

Figure 7:
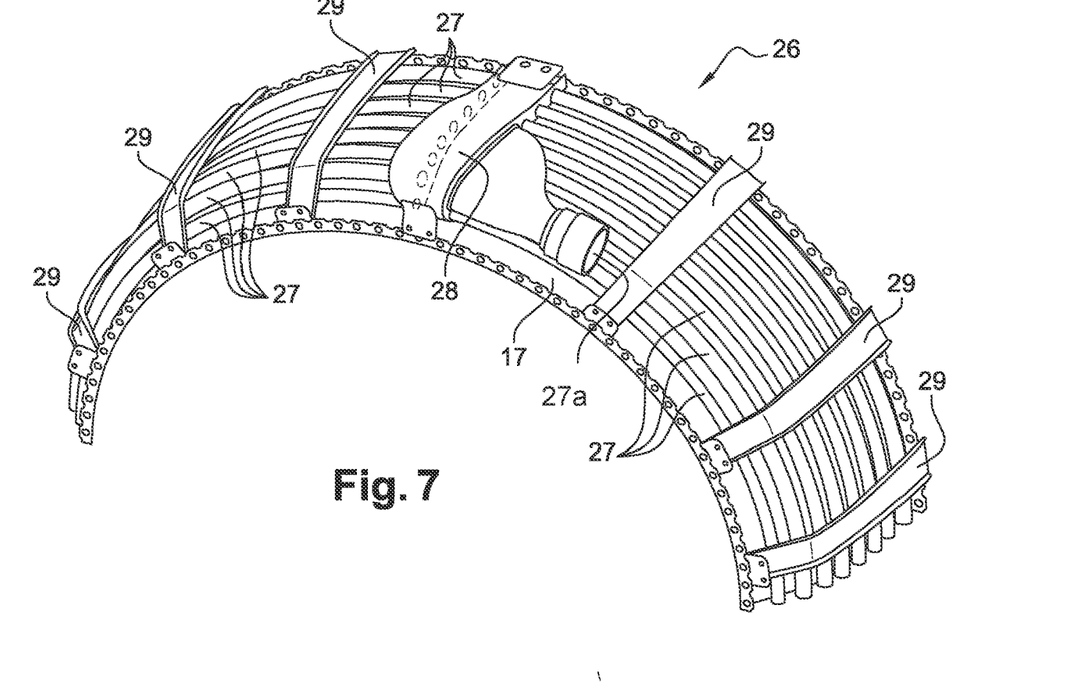
FIG. 7 is a perspective top view of an annular outer turbine casing cooling device according to the invention.
Figure 8:
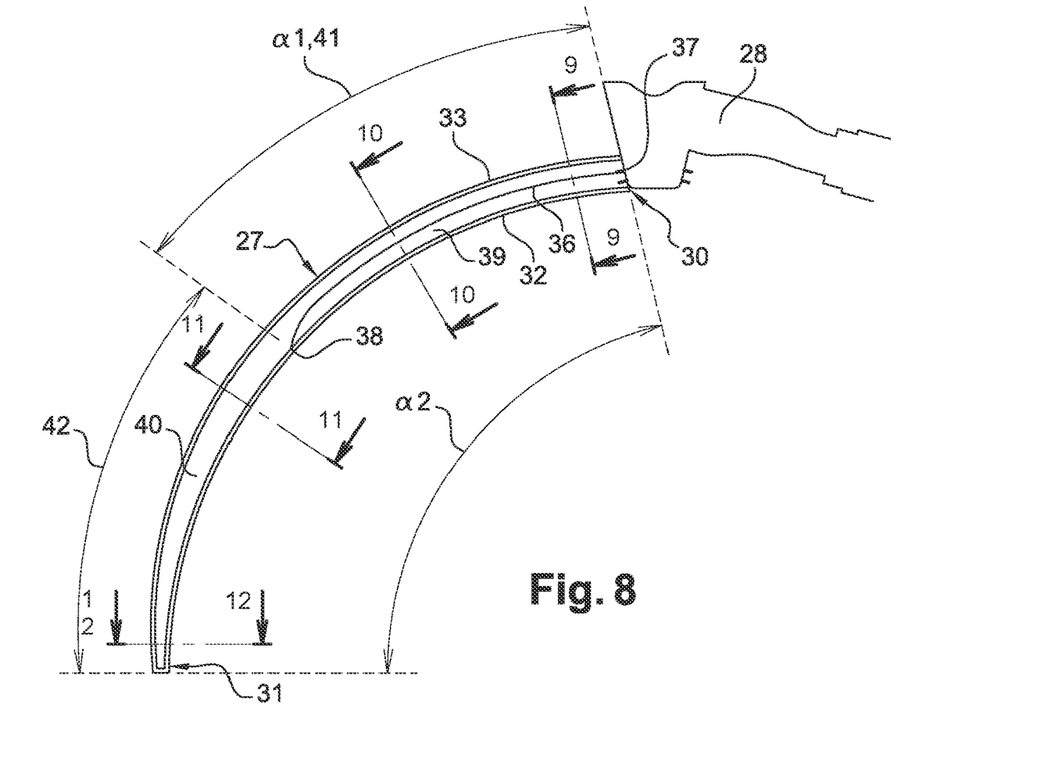
FIG. 8 is a cross-sectional view of the cooling device according to the invention.

The device 26 comprises several circumferentially extending tubes 27 connected to each other by a cooling air inlet manifold 28. Air enters tangentially or circumferentially into the manifold 28, through the inlet 27a, then the air from the manifold 28 enters tangentially or circumferentially into the tubes 27. The cooling device 26 is positioned radially outside the annular outer casing 17 of the turbine, in this case a low-pressure turbine 7.

For example, the cooling air is taken from the outlet of the low-pressure compressor 3 or high-pressure compressor 4. The cooling air has a relatively lower temperature than the temperature of the exhaust gases from the combustion chamber 5, which pass through the high pressure turbine 6 and the low pressure turbine 7. The temperature of the cooling air, for example, is between 200 and 300° C.

The tubes 27, sixteen in number in the example shown, are divided into two pairs of eight tubes axially offset from each other along the X axis. The two pairs of tubes 27 extend circumferentially opposite each other, each on one side of the air inlet manifold 28.

The tubes 27 of the same pair are held together on at least one axially extending arm 29, three arms 29 in the illustrated embodiment. Each arm 29 is stationary relative to the annular outer casing 17.

Each tube 27 includes a first end 30 forming an air inlet opening into the air inlet manifold 28, and a second end 31 circumferentially opposite the air inlet. Each tube 27 is closed at its second end 31.

Figure 9:
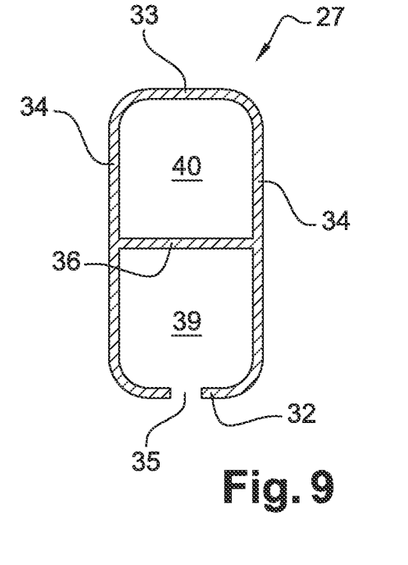
FIGS. 9-12 are cross-sectional views of a tube of the device, according to planes 9-9, 10-10, 11-11 and 12-12 of FIG. 8 respectively.

Each tube 27 comprises a radially inner wall 32, located opposite the annular outer casing 17, and a radially outer wall 33. Said walls 32, 33 are positioned radially opposite each other. The radially inner wall 32 and the radially outer wall 33 are connected to each other by two radially extending side walls 34.

The radially inner wall 32 is provided with discharge openings 35 allowing cooling air to pass from the inside of the concerned tube 27 to the outside. In particular, the cooling air is discharged from the tube 27 through the discharge openings 35 towards the annular outer casing 17, in order to cool it.

Each tube 27 also includes an intermediate wall 36 extending over a circumferential portion of the tube 27 from the air inlet 30. The intermediate wall 36 is located radially between the radially inner wall 32 and the radially outer wall 33. The intermediate wall 36 has a first end 37 through which it is connected to the air inlet manifold 28, and a second end 38 circumferentially remote from the first end 37, the second end 38 joining the radially inner wall 32. The intermediate wall 36 also extends between the two side walls 34.

A first air duct 39 is delimited by the radially inner wall 32, the intermediate wall 36 and the side walls 34. A second air duct 40 is delimited by the radially outer wall 33, the intermediate wall 36 and the side walls 34.

Figure 10:
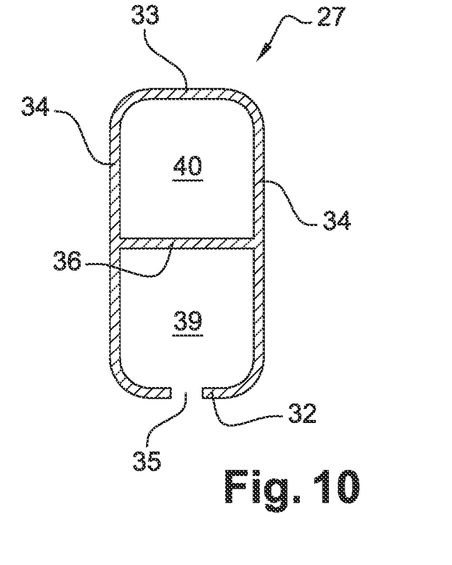

Each duct 39, 40 has a square or rectangular section.

The first duct 39 and the intermediate wall 36 extend from the air inlet 30 to an angle $\alpha 1$ taken in a plane perpendicular to the axial direction of the turbomachine between 0 and 45°.

The second duct 40 and the tube 27 extend from an air inlet 30 to an angle $\alpha 2$ taken in a plane perpendicular to the axial direction of the turbomachine between 45 and 90°.

The first circumferential zone 41 is defined as the zone between the air inlet 30 of the tube 27 and the junction zone between the intermediate wall 36 and the radially inner wall 32, i.e. extending between 0° and $\alpha 1$ A second circumferential zone 42 is defined as the zone between the junction zone between the intermediate wall 36 and the radially inner wall 32 and the second end 31 of the tube 27, i.e. extending between $\alpha 1$ and $\alpha 2$ The second duct 40 is located radially outside the first duct 39 in the first circumferential zone 41.

As shown in FIG. 8, the cross-section of the second duct 40 in the second circumferential zone 42 decreases with the angular position relative to the air inlet 30. In other words, in the second circumferential zone 42, the cross-section of the second duct 40 is larger at the angle $\alpha 1$ than at the angle $\alpha 2$.

FIGS. 9 to 12 illustrate sections of a tube 27 of the cooling device 26, respectively according to planes 9-9, 10-10, 11-11 and 12-12 shown in FIG. 8.

Figure 11:
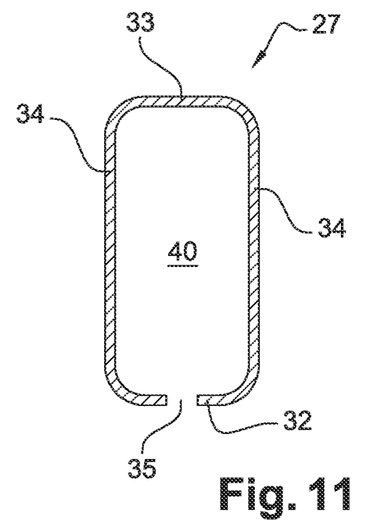

In FIGS. 9 to 11, the sections are rectangular, with the longest sides of the sections extending radially.

Sections 9-9 and 10-10, in FIGS. 9 and 10 respectively, illustrate the two ducts 39, 40, each duct 39, 40 having a substantially square cross-section. Section 11-11, in FIG. 11, located between $\alpha 1$ and $\alpha 2$, corresponds only to the second duct 40, the section plane 11-11 being located closer to the angle $\alpha 1$ than to the angle $\alpha 2$.

Figure 12:
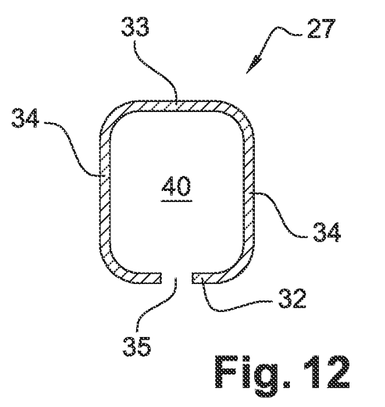

Finally, in FIG. 12, the tube 27 has a substantially square cross-section, the section plane 12-12 being located between $\alpha 1$ and $\alpha 2$, closer to the angle $\alpha 2$ than to the angle $\alpha 1$.

In operation, the cooling air from the manifold 28 enters each tube 27 through its air inlet 30. The cooling air is then conveyed through each duct 39, 40 so that it is discharged from the tubes 27 through the discharge openings 35 in the radially lower wall 32. In particular, in this embodiment, air enters tangentially or circumferentially into the manifold 28, through the inlet 27a, then the air from the manifold 28 enters tangentially or circumferentially into the tubes 27.

The air discharged through the openings 35 then impacts the annular outer casing 17 of the low-pressure turbine 7 in order to cool it.

The presence of the first duct 39 radially inside the second duct 40 ensures thermal insulation of the cooling air circulating in the first circumferential zone 41 of the second duct 40.

Thus, the air discharged from tube 27 in the second circumferential zone 42 maintains a relatively low temperature, which allows a homogeneous cooling over the entire circumference of the outer casing 17.

Figure 13:
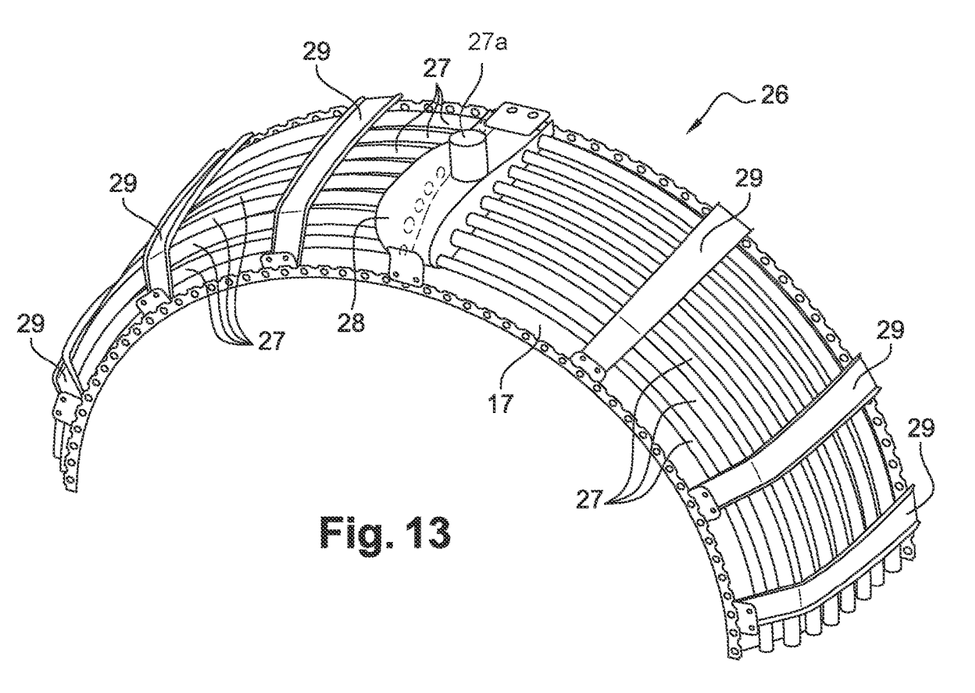
FIG. 13 is a view corresponding to FIG. 7, illustrating an alternative embodiment of the invention.

FIG. 13 illustrates an alternative embodiment that differs from the one shown above in that the air inlet 27a of the manifold 28 is directed radially so that air enters radially from the outside inwards into the manifold 28 before entering the tubes 27. Such an embodiment makes it possible to limit pressure drops within the manifold. This improves cooling efficiency.

The invention claimed is:

1. A device for cooling an annular outer turbine casing, the device comprising:
   at least one tube extending circumferentially around the annular outer turbine casing and having an air inlet intended for conveying cooling air, the at least one tube having a radially inner wall provided with cooling air discharge openings and a radially outer wall arranged radially opposite the radially inner wall,
   an air inlet manifold, the air inlet of the at least one tube opening into the air inlet manifold,
   characterized in that the at least one tube comprises an intermediate wall extending over a circumferential portion of the at least one tube from the air inlet of the at least one tube, the intermediate wall being located radially between the radially inner wall and the radially outer wall, the radially inner wall and the intermediate wall forming a first air conveying duct, the radially outer wall and the intermediate wall forming a second air conveying duct extending circumferentially, from the air inlet of the at least one tube to beyond the first air conveying duct,
   wherein the intermediate wall has a first end through which it is connected to the air inlet manifold, and a second end circumferentially remote from the first end, the second end joining the radially inner wall,
   wherein the device comprises at least two tubes, each tube being axially offset from each other tube, the air inlet of each of the at least one tube opening into the air inlet manifold.

2. The device according to claim 1, wherein the intermediate wall extends circumferentially over an angle between 0 and 45° from the air inlet, the radially inner wall and the radially outer wall each extending at an angle between 0 and 90° from the air inlet.

3. The device according to claim 2, wherein a cross-section of the at least one tube decreases with a circumferential position relative to the air inlet.

4. The device according to claim 2, wherein a cross-section of the at least one tube and the first air conveying duct and the second air conveying duct is substantially square or rectangular.

5. The device according to claim 2, characterized in that the first air conveying duct and the second air conveying duct are additively manufactured with the at least one tube.

6. The device according to claim 1, wherein a cross-section of the at least one tube decreases with a circumferential position relative to the air inlet.

7. The device according to claim 6, wherein a cross-section of the at least one tube and the first air conveying duct and the second air conveying duct is substantially square or rectangular.

8. The device according to claim 6, characterized in that the first air conveying duct and the second air conveying duct are additively manufactured with the at least one tube.

9. The device according to claim 1, wherein a cross-section of the at least one tube and the first air conveying duct and the second air conveying duct is substantially square or rectangular.

10. The device according to claim 9, characterized in that the first air conveying duct and the second air conveying duct are additively manufactured with the at least one tube.

11. The device according to claim 1, characterized in that the first air conveying duct and the second air conveying duct are additively manufactured with the at least one tube.

12. The device according to claim 1, comprising at least two tubes extending circumferentially opposite each other, the air inlet of each at least one tube opening into the air inlet manifold.

13. A turbine assembly, comprising:
   the annular outer turbine casing according to claim 1; and
   the device for cooling the annular outer turbine casing according to claim 1, located radially outside the annular outer turbine casing, the air discharge openings being oriented towards the annular outer turbine casing.

14. A turbine for a turbomachine, having an assembly comprising:
   the annular outer turbine casing according to claim 1; and
   the device according to claim 1 for cooling the annular outer turbine casing located radially outside the annular outer turbine casing, the air discharge openings being oriented towards the annular outer turbine casing.

\* \* \* \* \*